United States Patent [19]
Kramer

[11] 3,743,306
[45] July 3, 1973

[54] SEAL FOR ROTARY OSCILLATING SHAFT
[75] Inventor: James H. Kramer, Akron, Ohio
[73] Assignee: The B. F. Goodrich Company, New York, N.Y.
[22] Filed: Aug. 9, 1971
[21] Appl. No.: 170,246

[52] U.S. Cl. ............... 277/187, 114/162, 308/36.1, 277/156
[51] Int. Cl. ............................................. F16j 15/24
[58] Field of Search ................. 308/36.1; 285/281, 285/276, 261; 114/162, 168, 169; 277/187, 188, 237, 165

[56] References Cited
UNITED STATES PATENTS
3,188,152   6/1965   Miller ............................... 308/36.1
FOREIGN PATENTS OR APPLICATIONS
1,039,870   9/1958   Germany ......................... 114/162

Primary Examiner—Herbert F. Ross
Assistant Examiner—Robert I. Smith
Attorney—R. A. Johnston

[57] ABSTRACT

A seal having a hollow center hub with a ring of elastomer bonded around the hub with the elastomer received in a radially compressed state in an outer housing. A thin layer of antifriction material is provided on the inner periphery of the housing radially intermediate the elastomeric ring and the housing. Rotation of the hub less than a predetermined amount is resisted by elastic deformation of the elastomer, whereas, rotation of the hub in excess of the predetermined amount causes the outer periphery of the elastomeric ring to move relative to the housing.

8 Claims, 6 Drawing Figures

PATENTED JUL 3 1973 3,743,306
SHEET 1 OF 4
Fig.1
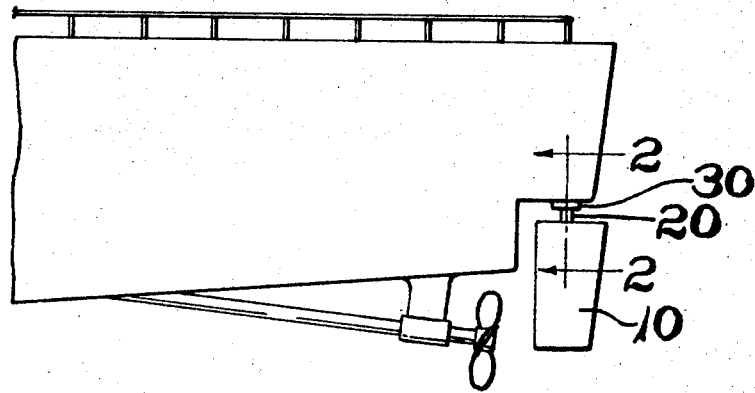
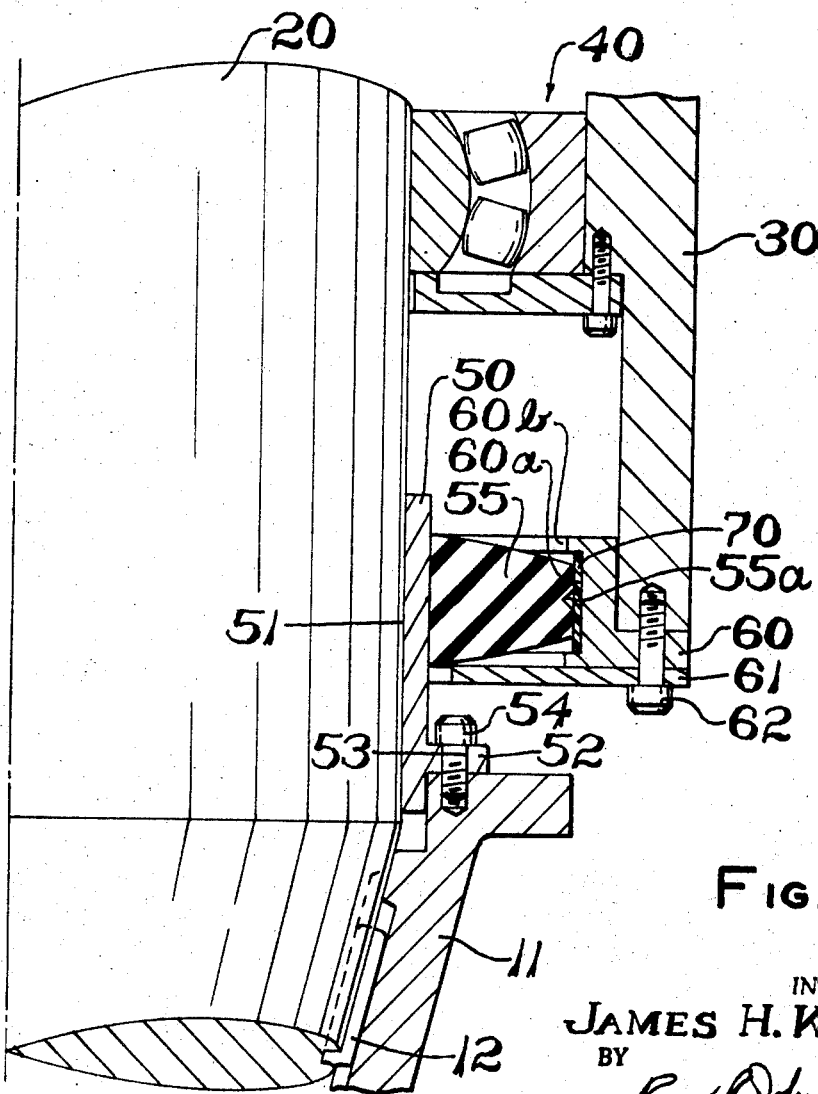
Fig.2
INVENTOR.
JAMES H. KRAMER
BY
Roger L. Johnston
ATTY.

SEAL FOR ROTARY OSCILLATING SHAFT

BACKGROUND OF THE INVENTION

In applications where it is required to provide a fluid pressure seal about an oscillating rotary shaft, it has been found that relative motion of the components of the seal with respect to each other often permits fluid leakage under pressure. Attempts to design a static seal for an oscillating shaft have generally proved unsuccessful where large increments of angular rotation of the shaft are encountered.

A particular application where it has proved difficult to seal about an oscillating shaft is that encountered in marine service where it is required to provide a watertight seal for the bearings on the vertical steering rudder pivot shaft. In service, the majority of the angular deflections of the rudder for on-course steering corrections are incrementally small. However, during low-speed manuvering and docking, large rudder deflections are encountered which render it virtually impossible to provide a seal for the rubber post bearing which is of the static type. Previous attempts to provide a static seal for such service have utilized concentric labryinth arrangements of elastomeric segments to enable the elastomer to absorb large angular deflections of the rubber. However, seals of this type have proved unwieldy to design. The mass of elastomer required to absorb the torsional deflection and yet provide sufficient axial resistance to sea water pressure causes such seals to be quite costly and complicated to manufacture and install. This problem has been particularly acute for very large rudder post bearings for ocean-going freighters and liners. The problem of providing seals for this type service is further aggravated by the presence of bearing lubricating oils on one side, which are often under pressure to provide adequate bearing lubrication and counteract the hydrostatic forces applied by the sea water on the other side.

Attempts to utilize moving or dynamic type seals for marine rudder post applications have proved generally unsuccessful for large bearings and rudder post shafts which require a large area of sealing material, usually elastomer, to move against the housings or external retainer rings. The movement of the large area of elastomer has resulted in short service life for the seal due to abrasion and wear of the sealing material which ultimately caused leakage. The abrasion is further aggravated by inclusion of foreign material encountered in the sea water. Once foreign objects become embedded in the moving surface of the elastomer, channels or grooves are formed in the seal surface and the seal begins to leak. Thus, it has long been desirable to provide a seal for marine rudder post bearings which will withstand the pressures of sea water and permit large angular deflections of the rudder post shaft and maintain its water pressure sealing integrity throughout a long service life.

SUMMARY OF THE INVENTION

The present invention provides a solution to the above-described problem of sealing fluid pressure about a rotary oscillating shaft. The invention is particularly directed to the problem of sealing marine rudder post bearings against entry of sea water. The seal of the present invention permits and absorbs small incremental deflections of the steering rudder for on-course corrections without frictional movement of the seal material with respect to the stationary housings and retainers. Upon encountering large rudder deflections, the seal of the present invention permits the elastomeric seal portion to move with respect to the housing. The present seal enables the majority of the steering rudder movements to be performed without frictional movement of the seal and, thus, the present seal is therefore able to give increased service life.

The seal of the present invention has an annular ring of elastomeric material bonded to a hollow hub and the assembly thus formed is received in a radially compressed state in an annular stationary housing. A layer of antifriction material is provided on the inner periphery of the housing radially intermediate the outer periphery of the elastomeric ring and the housing. The hub is adapted to be secured over a rotary oscillating shaft. Rotation of the hub with respect to the stationary housing, by the shaft, causes torsional deformation of the elastomeric ring until a predetermined amount of deflection is encountered, whereupon the elastomeric ring rotates with respect to the housing by virtue of the antifriction material. The present invention thus provides a solution to the above-described problems by providing a seal which absorbs small rotational deflection of the shaft by elastic deformation of the elastomer and large deflection of the shaft are accommodated by rotation of the elastomer with respect to the outer housing.

BRIEF DESCRIPTION OF THE DRAWINGS

FIG. 1 is a side elevation of the stern portion of a ship showing the arrangement of the steering rudder;

FIG. 2 is a portion of an enlarged section view taken along section-indicating lines 2-2 of FIG. 1 and shows the details of the rudder post shaft, bearing and seal installation;

DETAILED DESCRIPTION

Figure 3:
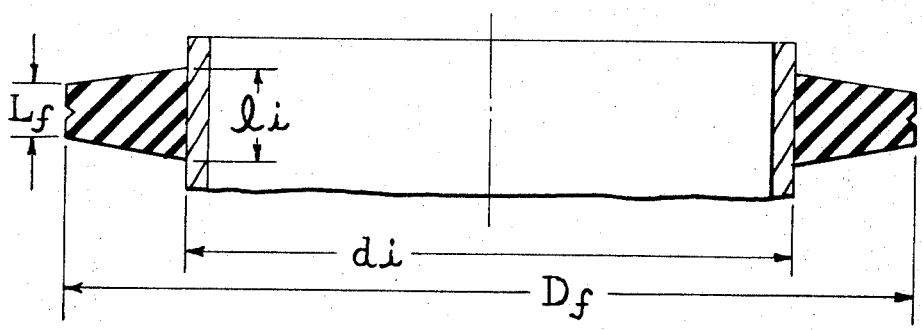
FIG. 3 is a section view of the elastomeric ring as bonded to the hub before assembly into the housing with the principal measurements used in the computations being illustrated.

Referring now to FIG. 1, a ship's rudder 10 is attached pivotally to the ship by steering post 20 which has a bearing and sealing enclosed in housing 30.

Referring now to FIG. 2, the rudder shaft 20 is shown as attached to the rudder by means of a rudder hub casting 11 and a key 12. A bearing assembly 40 is illustrated for reference purposes to indicate the typical arrangement of a lower rudder post bearing which absorbs loads perpendicular to the post shaft axis.

The seal of the present invention has a hub 50 formed of rigid material usually of navel brass or one of the Monels, the hub having an inner periphery 51 adapted to slip fit over the rudder post shaft and further having a flange 52 extending radially from the outer periphery with a plurality of holes 53 provided in the flange for receiving attachment bolts 54 which attach the hub to the rudder hub casting. A ring 55 of elastomeric material suitable for service exposure to both lubricating oils and sea water is provided with the inner periphery of the ring received over the outer circumference of the hub 50 and bonded securely thereto such that relative rotation therebetween is prevented. In the presently preferred practice of the invention, the ring 55 has a trapezoidal transverse section with the radially inner base axially wider than the outer base of the trapezoid. A circumferential groove 55a is provided in the outer periphery of the elastomeric ring which groove serves as a collector for foreign matter which may work into the outer periphery of the ring in service. An outer retaining ring, or seal housing, 60 of annular configuration is provided with the ring 60 secured to the bearing housing 30 by a cover plate 61 and a plurality of bolts 62 through holes provided in the cover plate and housing ring 60. In the presently preferred practice of the invention, the housing ring 60 has a circumferential groove 60a formed on the inner periphery thereof with the bottom of the groove cylindrically straight and provided with a layer of antifriction material 70, preferably of the type of material known as polytetrafloroethylene or polychlorotrifloroethylene known by the trade names, respectively, as Teflon and Kel-F. The elastomeric ring 55 is received in the groove 60a in housing ring 60 with the outer periphery of the elastomeric ring initially in a radially compressed state between the rigid hub 50 in the groove 60a in the housing ring 60 such that the outer periphery of the elastomeric ring 55 is in pressure contact with layer 70 of antifriction material. In the presently preferred practice of the invention, the hub 50 with the elastomeric ring 55 is pressed axially into a cone, not shown, which compresses the outer periphery of the elastomeric ring 55 to a diameter equal to or less than the diameter of the edges 60b of the groove 60a so that the elastomeric ring may be assembled axially into the housing ring 60 after which the cone is removed. The assembly of the hub, elastomeric ring and housing ring 60 is then received over the rudder post shaft 20 and secured to the bearing housing 30 in the rudder hub casting 11. Any convenient static sealing means, as, for example, an O-ring, may be provided on the inner periphery of the hub 50 for preventing fluid entry between the rudder shaft 20 and the seal hub 50.

Figure 4:
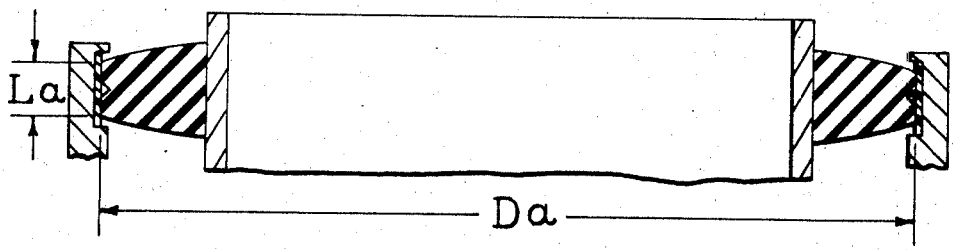
FIG. 4 is a view similar to FIG. 3 with the hub-ring assembly installed in the housing, with the principal measurements used in the computations being illustrated.

In applying the present invention to a particular seal configuration, the elastomeric ring 55 should preferably be chosen so as to have a bulge ratio, $\beta$, in the ring of 0.20 – 3.0. The bulge ratio $\beta$ may be determined from $$\beta = N\mu,$$

where N is the equivalent bulge ratio of a compressed rubber pad of equivalent area, which has been bonded to the opposite compressive surfaces, and where $\mu$ is the coefficient of friction against the layer anti-friction material 70. Where the elastomeric ring has a trapezoidal cross section, the equivalent bulge ratio N is found from the expression $$N = [D_f L_f + di \, li]/(D_f^2 - di^2);$$

where, referring to FIG. 3 and FIG. 4, $D_f$ is the free outer diameter of elastomer ring 55, $L_f$ is the free axial length of the outer diameter of the ring 55, $di$ is the outer diameter of the hub 50 and $li$ is the axial length of the base of the ring 55 as bonded to the hub 50.

Figure 5:
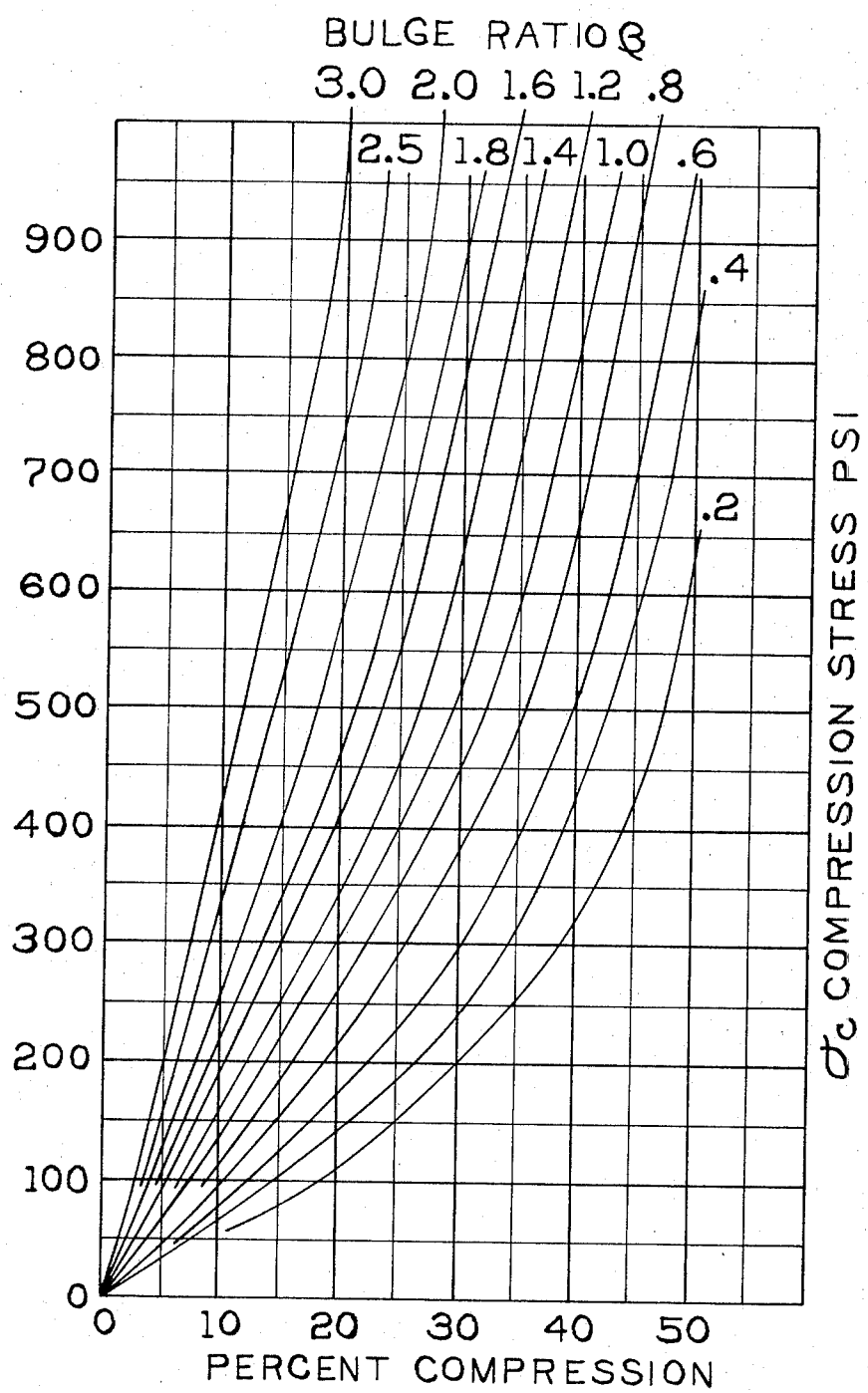
FIG. 5 is a graphical plot of values of compressive stress as a function of the percent compression for various values of bulge ratio $\beta$.

When the bulge ratio $\beta$ has been computed, the compressive stress $\sigma_c$ is determined from a graphical plot of compressive stress as a function of percent compression for various bulge ratios as illustrated in the family of curves in FIG. 5. In the presently preferred practice, the present of the dimensions of the seal are chosen so that the compression of the rudder is limited to a range of 10 – 20 percent and the compressive stress found from FIG. 5 is in the range of 100 – 200 psi. If for a given set of seal dimensions the compressive stress is found from FIG. 5 to exceed 200 psi at 20 percent radial compression, the seal dimensions are altered to give less compression and a lower bulge ratio to thus provide a compressive stress in the desired range. The graph illustrated in FIG. 5 represents data for an elastomer of 50 durometer shore A: for harder elastomers, the curves of the graph would move to the left, as may be determined from published data on the mechanical properties of various elastomers.

When the compressive stress $\sigma_c$ has been determined, as, for example, for FIG. 5, the radial force is determined from the formula $$F_R = (\sigma_c \pi/2)(D_f L_f + di \, li)$$

where $F_R$ is the total radial compressive force in the elastomeric ring 55. The torque at slip, or break-away torque required to move the elastomeric ring 55, with respect to housing 60, may then be determined from the relationship $$T_s = F_R \mu (D_a/2),$$

where $T_s$ is the torque at slip in units pound-inches and $D_a$ is the compressed outer diameter, in inches, of the elastomeric ring 55 (see FIG. 4).

Figure 6:
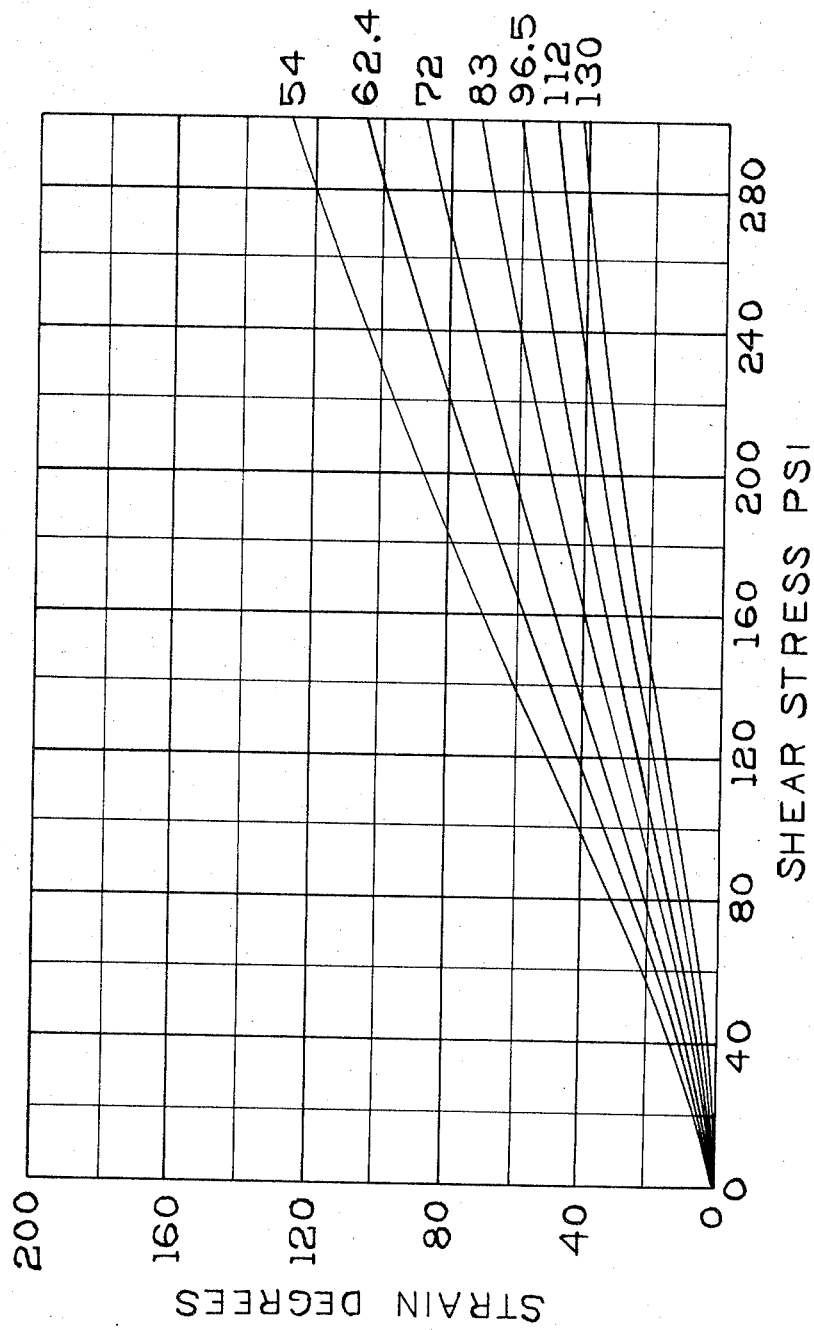
FIG. 6 is a graphical plot of values of shearing stress as a function of polar strain in the elastomeric ring for various values of shear modulus of the elastomer.

When the torque $T_s$ at slip has been determined, the rotary deflection or strain of the hub 50 may be found from plots of polar strain as a function of stress for a rubber annulus and such a plot is shown in FIG. 6.

In order to determined the amount of rotation of the hub 50 at incipient slip of the elastomeric ring 55 with respect to the housing 60, the stress $\tau_h$ in the elastomeric ring at the hub is determined from the formula $$\tau_h = (T_s)/(\pi/2 \, di^2 \, li)$$

where $T_s$, $di$ and $li$ are as defined supra. The corresponding shear stress $\tau$; at the outer periphery of ring 55 for incipient slip, at the surface of the housing 60, is determined from the formula $$\tau_o = (di^2/Da^2) \, \tau_h,$$

where $Da$ is compressed diameter of the outer periphery of the ring 55 when installed in housing 60 and $di$ and $\tau_h$ are as previously defined.

The rotational or polar strain $\alpha$ of the inner periphery of the ring 55, in degress of hub rotation may then be found by entering the graph (see FIG. 6) of the polar strain, as a function of shear stress for various values of shear modulus, using published handbook values for the shear modulus of the particular elastomer being used and the value of shearing sress $\tau_h$ previously computed at the hub. The polar strain $\gamma$ at the outer periphery of the ring 55 at incipient slip, may be found in a similar manner from a graph of polar strain as a function of shearing stress (see FIG. 6) using the published handbook values of shear modulus of the particular rubber being used and the value of $\tau_o$ previously computed. The number of degrees of hub rotation $\theta$ at incipient slip of the ring 55 with respect to the housing 60 is then:

$$\theta = \alpha - \gamma,$$

and represents the amount of rudder post rotation which may be absorbed by the elastomeric ring 55 of the seal of the present invention without relative movement of the ring 55 with respect to the housing 60.

The present invention provides a seal in which elastomeric ring, in a radially compressed state, absorbs by torsional elastic deformation, small angular deflections of the rubber shaft and upon encountering large deflections of the rudder shaft the outer periphery of the elastomeric ring moves against a layer of antifriction material provided on the outer housing ring.

Modifications and adaptation of the present invention will be apparent to those having ordinary skill in the art, with the invention being limited only by the spirit and scope of the following claims.

I claim:

1. A seal adapted for sealing an oscillating rotary member comprising:
   a. a pair of rigid members disposed in concentric arrangement with their juxtaposed surfaces cylindrical and radially spaced;
   b. means to connect one of said members to an arcuately oscillatable member;
   c. means to hold the other of said members stationary;
   d. an antifriction material on one of said cylindrical surfaces; and,
   e. an annular sealing member of elastically deformable material having inner and outer concentric surfaces one of which is bonded to the other of said cylindrical surfaces and the other of the concentric surfaces of the sealing member engaging the said antifriction material in radial pressure exerting relationship, whereby relative rotation of said rigid members an amount less than a predetermined minimum is resisted by elastic deformation of said sealing member and relative rotation of said rigid members in excess of the said predetermined minimum causes circumferential movement of said sealing member over said antifriction material.

2. The seal defined in claim 1, wherein said sealing member is a ring of vulcanized elastomeric material and said antifriction material is a ring of material chosen from the group consisting of polytetrafluoroethylene and polychlorotrifluoroethylene.

3. The seal defined in claim 1, wherein the said rigid member provided with antifriction material has integral portions at axially opposite ends thereof extending radially beyond said material for preventing axial removal of the sealing member.

4. The seal defined in claim 1, wherein said means to hold one of said rigid members stationary comprise mounting portions formed integrally thereon which are adapted for attaching to a shaft housing.

5. The seal defined in claim 1, wherein the means to connect the said one rigid member includes means therein for securing the last mentioned member to a shaft.

6. The seal defined in claim 5, wherein said attaching means comprises a hub member having a bore with a keyway extending axially of the hub bore.

7. The seal defined in claim 6, wherein said hub member has at least one circumferential groove formed in the bore thereof which groove is adapted to receive therein sealing means for sealing against a shaft received therein.

8. The seal defined in claim 1, wherein said sealing member has at least one circumferential groove formed in the outer periphery thereof for receiving and collecting foreign matter.

* * * * *